United States Patent [19]

Nass et al.

[11] Patent Number: 5,064,877
[45] Date of Patent: Nov. 12, 1991

[54] PROCESS FOR FIXING INORGANIC SPECIES IN AN ORGANIC MATRIX

[75] Inventors: Rüdiger Nass; Helmut Schmidt, both of Zellingen, Fed. Rep. of Germany

[73] Assignee: Fraunhofer-Gesellschaft Zur Forderung Der Angewandten Forschung e. V., Fed. Rep. of Germany

[21] Appl. No.: 380,523

[22] Filed: Jul. 17, 1989

[30] Foreign Application Priority Data

Jul. 18, 1988 [DE] Fed. Rep. of Germany ....... 3824333

[51] Int. Cl.$^5$ .............................................. C08F 30/04
[52] U.S. Cl. .................................... 522/172; 522/177; 522/183; 526/219.6; 526/232.1; 526/239; 526/240; 526/241; 526/279; 528/13; 528/14
[58] Field of Search ...................... 526/240, 241, 219.6, 526/232.1, 239, 279; 522/172, 177, 183; 528/13, 14

[56] References Cited

U.S. PATENT DOCUMENTS 4,835,231 5/1989 Yamamori et al. ................. 526/240

Primary Examiner—Paul R. Michl
Assistant Examiner—T. McDonald, Jr.
Attorney, Agent, or Firm—Oblon, Spivak, McClelland, Maier & Neustadt

[57] ABSTRACT

A process is described for fixing an inorganic species in an organic matrix, which comprises bringing a compound of the formula $MR_n$ in which M is selected from sub-group metals, lanthanides, actinides, Al, Sn, B and Si, and the radicals R can be replaced by a complexing agent, into contact with a complexing agent, the complexing agent containing a functional group which is capable of participating in a polymerization or polycondensation reaction. After complexing, hydrolysis and condensation are preferably first carried out, followed by polymerization or polycondensation.

19 Claims, No Drawings

PROCESS FOR FIXING INORGANIC SPECIES IN AN ORGANIC MATRIX

The present invention relates to a process for fixing an inorganic species in an organic matrix, in particular the homogeneous embedding of inorganic polycondensates in an organic polymer matrix.

PRIOR ART

In recent decades, plastics have in many areas replaced conventional materials such as metal, wood, glass, natural fibers etc. to an increasing extent. However, the increasing availability and use of plastics have also been accompanied by increased demands with respect to their properties. This relates to the behavior of the plastics both during processing and also during later use. An essential aspect on assessment of the utility of a plastic is its strength, for example its breaking strength, tear strength, impact resistance etc. For this reason, a very wide variety of measures have already been taken to impart a prespecified plastic with the desired properties. One of these methods comprises, for example, to incorporate reinforcing fibers of an organic and, in particular, an inorganic nature, such as, for example, glass fibers, into the plastic and thereby to provide the organic polymer matrix with a supporting structure. In the case of reinforcing using fibers, it has become apparent that the results are better the smaller the dimensions of these fibers. However, it is not possible, or at least only possible at unacceptably great expense, to produce fibers with dimensions as small as desired.

Furthermore, it is also known that the reinforcing effect of the fibers is the greater the more compatible they are with the polymer matrix, i.e. the firmer they can be anchored therein. Here too, problems generally occur, since, for example, inorganic fibers (glass fibers) and organic polymers are so different with respect to their structure that only a weak interaction, if any at all, results between the fibers and matrix. In general, it must therefore be attempted to modify the surface of the fibers in a manner such that anchoring points are provided thereon for the polymer matrix. This process is inconvenient, but is nevertheless not always crowned by the desired success.

A third problem in the reinforcement of plastics with fibers is that the fibers must be distributed as uniformly as possible in the polymer matrix in order to ensure that the strength properties of an article produced therefrom are equal at all points, i.e. there are no weak points caused by a below-average level of fibers. Even this homogeneous distribution of the fibers in the matrix can generally not be achieved simply, in particular due to the fact that the starting materials required for the preparation of the organic matrix usually already have a relatively high viscosity.

SUMMARY OF THE INVENTION

The present invention therefore has the object of providing a process which makes it possible to circumvent the above problems, where the process is not limited to the incorporation of fibers into an organic matrix, but should very generally make it possible to distribute an inorganic species homogeneously in an organic matrix and to anchor it firmly therein.

This object is achieved according to the invention by a process which comprises bringing at least one compound of the empirical formula (I)

$$MR_n \quad (I)$$

in which M is selected from sub-group metals, lanthanides, actinides, Al, Sn, B and Si; at least some of the radicals R, which may be identical or different, can be replaced by a complexing agent; and n is the quotient of the valency of M and the mean valency of the radicals R; if appropriate in partially hydrolized or pre-condensed form, into contact with at least one organic compound A which contains at least one functional group X which is capable of complexing with M and is capable of replacing at least some of the radicals R, and, in addition, contains at least one functional group Y which is capable of participating in a polymerization or polycondensation reaction, and, when complexing is complete, carrying out a polymerization or polycondensation in which the functional group(s) Y of compound A participates.

PREFERRED EMBODIMENTS

According to a preferred embodiment of the process according to the invention, the essential atoms M of the compounds of the empirical formula (I) are connected together in the organic matrix via oxygen bridges, the degree of crosslinking, i.e. the number of other central atoms connected to a certain central atom via oxygen bridges, being set through suitable choice of the molar ratio between compounds of the formula (I) and compounds A. For example, a degree of crosslinking of 2 means that a linear structure, i.e. a fiber structure, forms, while, for example, a three-dimensional network is produced in the case of a degree of crosslinking of 3. It is of course also possible to set degrees of crosslinking between, for example, 2 and 3.

In order to achieve a degree of crosslinking other than 0, the compound A is employed in a molar ratio such that, based on the compound of the formula (I), the number of theoretically replaceable radicals R is greater than the number of radicals theoretically replaceable by the groups X. The radicals R remaining on M after complexing are preferably those which are hydrolytically unstable, i.e. can be replaced by OH groups through reaction with water. The addition of water is preferably carried out here in a manner such that hydrolysis, i.e. replacement of the radicals R by OH groups, is followed by condensation of these OH groups with elimination of water, which can be brought about, for example, by adding suitable catalysts or by increasing the temperature.

Starting compounds of the formula (I) which are preferred according to the invention are those whose central atom M is selected from aluminum, vanadium, titanium, zirconium, hafnium, tin, uranium, boron and silicon, aluminum, titanium and zirconium being particularly preferred. It is of course also possible to employ several compounds of the formula (I) simultaneously. In this case, these compounds can have central atoms which are identical with or different from one another. According to a preferred embodiment of the present invention the number of different central atoms M present in the starting does not exceed three and, particularly, does not exceed two.

At least some, and preferably all, the radicals R in the compounds of the formula (I) are of a nature such that they can be replaced both by the functional group X of the compound A and by water. This property is not inherent in the radical R, but is instead dependent on the particular central atom M, which means that it is not possible to give generally applicable examples of radicals R of this type. However, the radicals R are preferably selected so that they satisfy the abovementioned conditions and at the same time have a relatively simple structure, which is also sensible, in particular, from an economical point of view, since these radicals will anyway later be replaced and are then virtually a waste product which is preferably no longer present in the end product.

Examples of radicals of this type are halogen, alkyl, alkoxy and acyloxy groups, although groups having a more complex structure, such as, for example, hydrocarbon radicals, branched or unbranched, which may be substituted by substituents, such as, for example, halogen, alkoxy, nitro and dialkylamino, may also be employed according to the invention. These groups can be bonded to the central atom M directly or, for example, via an oxygen atom, a nitrogen atom, a carbonyl group or an oxycarbonyl group.

Particularly preferred radicals R in the above formula (I) are, in each case dependent on the central atom M, halogen atoms (fluorine, chlorine, bromine and iodine, in particular chlorine and bromine); alkyl groups having 1 to 8, preferably 1 to 4, carbon atoms, for example methyl, ethyl, n-propyl, i-propyl, n-butyl, i-butyl and sec -butyl; alkoxy groups having 1 to 8, preferably 1 to 4, carbon atoms, for example methoxy, ethoxy, i-propoxy, n-propoxy, n-butoxy, i-butoxy, sec-butoxy, pentoxy and 2-ethylhexyloxy; and acyloxy radicals having 2 to 8, preferably 2 to 4, carbon atoms, for example acetoxy. Of these radicals, the alkoxy groups above are the most frequently preferred.

As already stated above, compounds of aluminum, titanium and zirconium are particularly preferred in the process according to the invention, in particular when the 3 or 4 radicals R in the above formula (I) are identical and represent alkoxy radicals having 1 to 4 carbon atoms.

It is of course also possible to employ already partially hydrolysed or partially condensed starting compounds of the formula (I), so long as they still dissolve to a significant extent in the solvent preferably used. The partial hydrolysates or partial condensates may also be derived from compounds having different central atoms M. Preferably, however, monomeric (i.e. not yet partially condensed) starting compounds of formula (I) are used.

In addition, it may be desirable to add a small amount of an optionally hydrolysable compound of another element, for example calcium, magnesium or barium.

Concrete examples of compounds $MR_n$ which are particularly preferred according to the invention are: $AlCl_3$, $Al(OC_2H_5)_3$, $Al(OC_3H_7)_3$, $Al(O-i-C_3H_7)_3$, $Al(O-sec.-C_4H_9)_3$; $TiCl_4$, $Ti(OC_2H_5)_4$, $Ti(OC_3H_7)_4$, $Ti(O-i-C_3H_7)_4$, $Ti(OC_4H_9)_4$, $Ti(2-ethylhexoxy)_4$; $ZrCl_4$, $Zr(OC_2H_5)_4$, $Zr(OC_3H_7)_4$, $Zr(O-i-C_3H_7)_4$, $Zr(OC_4H_9)_4$, $ZrOCl_2$, $Zr(2-ethylhexoxy)_4$; $VOCl_3$, $V(OC_2H_5)_3$, $VO(OC_2H_5)_3$; $SnCl_4$; $B(OCH_3)_3$, $B(OC_2H_5)_3$; $SiCl_4$, $Si(OCH_3)_4$, $Si(OC_2H_5)_4$, $Si(OC_3H_7)_4$).

An organic compound A which is suitable according to the invention is any compound which contains at least one functional group X which is capable of complexing with M and is capable of replacing at least some of the radicals R, and, in addition, contains at least one functional group Y which is capable of participating in a polymerization or polycondensation reaction. In addition, the compound A should preferably be soluble in the solvent used and form with M a complex which is soluble in the solvent. An organic compound as defined herein is a compound which has a carbon-containing skeleton. In addition to carbon one or more elements selected from the group consisting of hydrogen, oxygen, sulfur and nitrogen may also be present in said skeleton.

Suitable functional groups X which are capable of complexing with M are, in principle, all groups which satisfy the abovementioned conditions. These are generally groups which contain at least two atoms having free electron pairs, in particular oxygen, nitrogen and sulfur, and coordinate to the central atom M via these electron pairs. According to the invention, particularly preferred functional groups are those which coordinate to the central atom via oxygen atoms. Examples of these are carboxyl groups (COOH or $COO^-$) and β-dicarbonyl structural elements (in particular —CO—CH$_2$—CO—). Alkanolamine structural elements can also prove to be an advantageous group X.

It is obvious that the choice of the functional group X also depends to a certain extent on the nature of the central atom M, since, for example, not all groups X have the optimum geometry for the size of the central atom M. However, the functional group X which is most suitable for a given compound of the formula (I) can be determined from simple experiments.

The functional group Y, which must likewise be present in the compound A, is of a nature such that it is able to participate in a reaction which results in the formation of an oligomeric or polymeric organic chain. Reactions of this type are generally polymerization or polycondensation reactions (or polyaduct formations). Preferred functional groups Y are those which are able to participate in a polymerization reaction, in particular a free-radical polymerization. Accordingly, the functional group Y is preferably an ethylenically (or acetylenically) unsaturated group, in particular a $CH_2=CZ$- group where Z represents H or $CH_3$.

In the compound A, the functional groups X and Y can either be connected directly to one another or separated by a structural element B, for example an alkylene group. According to the invention, the compound A can also contain more than one functional group X and/or Y. Examples of these are, for example, malonic acid or fumaric acid with two functional groups X and one functional group Y. However, compounds A which are preferred according to the invention are those which contain only one group X and Y.

The best choice of a compound A depends on a number of factors, such as, for example, the nature of the compound of the formula (I), the solvent used, the intended use of the end product etc. It may also be necessary to consider the accessibility of the compound A.

Examples of commercially available or easily preparable compounds A are the following: acrylic acid, methacrylic acid, allyl acetoacetate, vinyl acetoacetate, 5-hexene-2,4-dione and 5-methyl-5-hexene-2,4-dione.

In addition to the functional groups X and Y, the compound A can also contain other functional groups, which need only be of a nature such that they do not significantly impair the complexing or polymerization or polycondensation. In addition, the compound A need not necessarily be of a purely organic nature, but can also, under the prerequisites just mentioned, carry inorganic radicals, for example silyl groups.

The bringing into contact of the compound of the formula (I) with the compound A is preferably carried out in an organic solvent. The solvent should dissolve the starting materials and end products to a satisfactory extent and must be of a nature such that it does not hinder or even prevent complexing and, if appropriate, the reaction with water. In particular, it should not react with the components dissolved therein. Solvents which have proven particularly suitable for this purpose are polar organic solvents, although non-polar solvents or mixtures of polar and non-polar solvents can also be employed. Alcohols, in particular methanol, ethanol, n-propanol, i-propanol, butanol and mixtures thereof, are particularly preferred. Further solvents which can be used according to the invention are, for example, methylene chloride, chloroform, carbon tetrachloride, ethers, for example diethyl ether and tetrahydrofuran, ketones, for example acetone and butanone, esters, for example ethyl acetate, pentane, hexane, cyclohexane, benzene, toluene and mixtures of these solvents.

The process according to the invention can be carried out in a simple manner by first dissolving the starting compounds (compounds of the formula (I) and compounds A) in the pre-determined molar ratio in the solvent or solvent mixture selected. In certain cases, the desired complex can also be prepared by employing, in place of the pure starting compounds, a compound of the formula (I) which has already been considerably precomplexed with compound A in addition to a compound of the formula (I) which has not been pre-complexed, and the species with the complexing ratio actually desired then form in the solution by means of ligand exchange reactions.

When the desired complex is present in the solution, it can be isolated in a suitable manner, for example by stripping off the solvent, and, for the purpose of carrying out the polymerization or polycondensation reaction, re-dissolved in the same or another solvent. For practical reasons, however, it is preferred to carry out the polymerization or polycondensation in the solvent used for the complexing without isolation of the complex compound.

According to a preferred embodiment of the present invention, the individual central atoms M are also linked to a two- or three-dimensional structure via oxygen bridges before the polymerization or polycondensation is commenced. This is preferably effected by adding water to the solution containing the complex compound. The amount of water is preferably a stoichiometric amount of water, i.e. an amount which is theoretically necessary to replace by OH all the hydrolytically unstable radicals R still present on the central atom M after the complexing. It is preferred that all the radicals R still present on M can be removed hydrolytically. It is of course also possible to employ a sub-stoichiometric amount of water, which means that only some of the radicals R still present are replaced by OH. It is also possible to use an excess of water, although this has no purpose and is therefore also not preferred.

The nature of the addition of water, which is usually carried out, like the complexing, at between 0° and 40° C., preferably at room temperature, depends on the nature and, in particular, on the reactivity of the complex compound dissolved in the solvent and thus, in the end, on the nature of the central atom M and the number of groups X coordinated thereto. In general, the water can be added to the complex solution in one portion. This is because the complexing of the central atom M in the process according to the invention has the additional advantage that, even in the case of compounds which are normally highly reactive towards water (for example compounds of aluminum, titanium or zirconium), the hydroxides formed (or oxides after the condensation) do not precipitate out of the solution, but instead remain soluble. If, however, the degree of complexing should be low and the concentration high in the case of a highly reactive compound, it may be advisable to add the water in smaller portions. In these cases, it may also be advantageous to introduce the water into the reaction system with the aid of water-containing organic or inorganic systems. In many cases, the introduction of the water using moisture-charged adsorbents, for example molecular sieves, or water-containing organic solvents, for example 80% strength ethanol, has proven particularly suitable. The water can also be added via a reaction in which water is formed, for example in the ester formation from acid and alcohol (CCC = Chemically Controlled Condensation).

In order to accelerate the condensation which generally follows the hydrolysis, it is usually advantageous to increase the temperature and/or to carry out the hydrolysis in the presence of a condensation catalyst. Suitable condensation catalysts are compounds which eliminate protons or hydroxyl ions, and amines or amino derivatives. Specific examples are organic or inorganic acids, such as, for example, hydrochloric acid, nitric acid, sulfuric acid, phosphoric acid, formic acid or acetic acid, and organic or inorganic bases, such as ammonia, alkali metal hydroxides or alkaline earth metal hydroxides, for example sodium hydroxide, potassium hydroxide or calcium hydroxide, and amines which are soluble in the reaction medium, for example lower alkylamines. Volatile acids and bases, in particular hydrochloric acid, nitric acid, ammonia and triethylamine, are particularly preferred. If a compound which acts as catalyst is produced during the hydrolysis itself (for example hydrochloric acid during the hydrolysis of aluminum chlorides), the separate addition of a condensation catalyst is generally superfluous. Naturally, the condensation catalyst should be of a nature such that either it can be removed from the reaction mixture easily and preferably without leaving a residue or, however, its presence does not hinder the further reaction steps.

The spatial structure of the inorganic species which is later to be embedded in the organic matrix can be determined according to the invention through the chosen ratio between compounds of the formula (I) and compounds A on the one hand and water on the other hand. This will be illustrated using the example of a compound $MR_4$, where all four radicals R can be replaced by complexing agents and water, and a compound A which contains one functional group X.

If the above starting compounds are employed in an equimolar ratio (1:1), and sufficient water is added so that all the radicals R remaining on M are replaced by hydroxyl groups, which are then subjected to a condensation, the following picture arises:

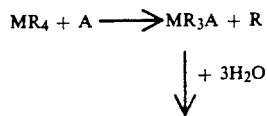

-continued

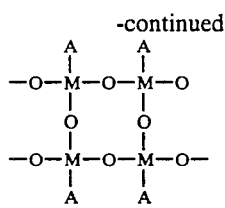

A three-dimensional network of central atoms M which are connected via oxygen atoms and of which each carries a complex ligand A is thus produced.

If the starting compounds are employed in the ratio 1:2, the result, after hydrolysis and condensation, is a linear chain of central atoms M which are bridged by oxygen atoms and which each carry two complex ligands A:

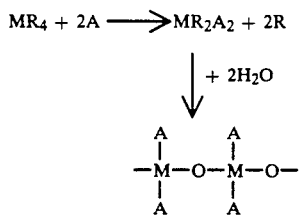

With this ratio (1:2), extremely small metal oxide fibers can thus be produced; these fibers can later be firmly anchored in the organic matrix via the functional groups Y of the compounds A.

If the $MR_4$:A ratio is reduced further, correspondingly shorter chains are obtained until, finally, at a ratio of 1:4, full complexation of M, which prevents hydrolysis and condensation, is present.

In the case of aluminum compounds of the general formula (II), the ratio between the aluminum compound and the compound A (having one functional group X) is, according to the invention, preferably chosen in the range of from 1:0.5 to 1:3, in particular 1:0.5 to 1:1. In these cases, the addition of a stoichiometric amount of water generally results in clear solutions (sols).

In the case of titanium and zirconium compounds of the general formula (III), the molar ratio to compound A is accordingly preferably selected at 1:0.5 to 1:2.

After the complexing and preferably after the partial hydrolysis and condensation of the complexes, a polymerization or polycondensation involving the functional groups Y present in the compounds A is initiated according to the invention. These reactions can either be carried out with exclusive participation of the functional groups Y, or one or more compounds which can be polymerized or polycondensed together with the functional groups Y are added to the solution of the hydrolytically condensed complex compound. The latter procedure is advisable, in particular, if the functional groups Y alone are totally incapable of polymerization or polycondensation (for example when the groups are of a type which can only undergo reaction with groups of another type, for example an ester formation) or if the groups Y are only capable of this to a limited extent (thus, for example, it is known that allyl compounds can only be polymerized with one another with difficulty, and monomers containing allyl groups generally only form oligomers having up to 50 monomer units).

Suitable copolymers or cocondensable compounds are, in principle, all compounds which are known for this purpose, so long as they dissolve to a satisfactory extent in the solvent used and are capable of undergoing an appropriate reaction with the group Y present in each case. Suitable copolymers for the free-radical polymerization which is preferred according to the invention are, for example, styrene and styrene derivatives, alkenes (ethylene, propylene, butene and isobutene), halogenated alkenes (tetrafluoroethylene, chlorotrifluoroethylene, vinyl chloride, vinyl fluoride, vinylidene fluoride and vinylidene chloride), vinyl acetate, vinylpyrrolidone, vinylcarbazole, (meth)acrylic acid and their derivatives thereof (in particular (meth)acrylonitrile and (meth)acrylates) and mixtures of monomers of this type. It is also possible to use according to the invention polyunsaturated compounds.

A copolymerization can also be carried out with compounds which are not of an exclusively organic nature, but instead also carry, for example, silyl groups. An example of compounds of this type is 3-(trimethoxysilyl)propyl methacrylate (MEMO).

The polymerization or polycondensation in the process according to the invention is carried out by methods which are generally known for this purpose. In the case of free-radical polymerization, a customary polymerization catalyst, for example benzoyl peroxide or azobisisobutyronitrile, is added, for example, to the solution containing the polymerizable components, and the temperature of the solution is then increased until the catalyst decomposes with formation of free radicals. In the case of the catalysts just mentioned, the temperature is approximately 80° to 100° C. The properties of the organic matrix can be varied within certain limits, for example through the type and amount of the catalyst, the polymerization temperature, the polymerization duration, etc. However, it is also possible, for example, to carry out a UV curing. UV initiators which are suitable for this purpose are known and commercially available (for example Dorocur ® 2273, 1173 and 1116 from Merck, or Irgacure ® 184 and 651 from Ciba-Geigy).

According to a preferred embodiment, the process according to the invention gives an organic polymer matrix in which an inorganic polycondensate structure is firmly anchored and the matrix is thereby strengthened to a great extent. Accordingly, the process according to the invention is suitable, in particular, for the preparation of monofiber-reinforced plastics, organic fibers with an inorganic reinforcement, homogeneous inorganic/organic copolymers, but also for monoliths having an organic supporting structure, and porous ceramics with defined pores. In addition, it is possible in an advantageous manner to produce coatings with a thickness of $\geq 1$ $\mu$m using the process according to the invention, as is illustrated in greater detail in Example 6 below. UV curing is particularly suitable for this purpose.

The advantages of the process according to the invention are, inter alia, that, due to the prior complexing, hydroxides which are soluble in organic solvents can be obtained, which considerably simplifies the formation of homogeneous products, and that the functionality of the hydroxide, and thus also the structure of the resultant condensate, can be determined on a molecular plane via the amount of complexing agent added.

The examples below illustrate the present invention.

EXPERIMENTAL PART

Example 1

20.64 g (84 mmol) of Al(O-sec.-Bu)$_3$ were dissolved in 75 ml of isopropanol and reacted with 10.90 g (84 mmol) of ethyl acetoacetate. The hydrolysis was carried out using 3.02 g (168 mmol) of water in 20 ml of isopropanol. Clear sols whose primary particle size was about 5 nm (determined by dynamic light scattering) were obtained. Removal of the solvent in a water-pump vacuum gave colorless gel powders which, after drying at 100° C. (2 to 4 hours), were soluble in toluene and an isopropanol/toluene mixture (1:1) without leaving a residue.

Analogous results were obtained when the amount of ethyl acetoacetate employed was reduced to 5.45 g (42 mmol). The particle size in this case was between 8 and 10 nm.

The above experiment was repeated using allyl acetoacetate, and similar results were obtained.

The presence of complexed aluminum hydroxides was demonstrated with reference to the IR spectra. The C and H elemental analysis also confirmed the composition of the complexed aluminum hydroxide. According to this analysis, the complexing agent was still present quantitatively even after drying at 100° C.

The condensation of the above aluminum hydroxides can be initiated by acid catalysis or by increasing the temperature.

Example 2

5.03 g of Al(O-sec.-Bu)$_3$ were dissolved in 5 ml of toluene, and 2.90 g of allyl acetoacetate were added (molar ratio 1:1). The hydrolysis was carried out with addition of 0.74 g of H$_2$O in 5 ml of sec.-butanol. After addition of 100 mg of benzoyl peroxide, the mixture was warmed at 100° C. for 1 hour, during which time the viscosity increased.

Highly polymeric compounds were not obtained by this process since allyl groups can only be polymerized with one another with difficulty.

Example 3

5.35 g of Al(O-sec.-Bu)$_3$ were dissolved in 20 ml of toluene and reacted with 3.09 g of allyl acetoacetate. The hydrolysis was carried out using 0.72 g of H$_2$O in 5 ml of sec.-butanol. After addition of water, the mixture was stirred at room temperature for half an hour. 5 g of styrene and 0.1 g of benzoyl peroxide were added to the resultant hydrolysate. The polymerization, which was indicated by a considerable increase in viscosity, was effected by warming the mixture for one hour at 80° to 100° C. After drying, colorless copolymers which exhibited no glass transition temperature for polystyrene on DSC investigation (Differential Scanning Calorimetry) were obtained. Instead, continuous degradation of the organic matrix occurred above 250° C.

Example 4

10.17 g of Al(O-sec.-Bu)$_3$ were dissolved in 70 ml of toluene/isopropanol (1:1), and 3.62 ml of methacrylic acid (Al:methacrylic acid molar ratio=1:1) were added. After the mixture had been stirred for 30 minutes, 50 mg of benzoyl peroxide were added and the reaction mixture was warmed at 80° C. After about 10 minutes, a highly viscous, clear material was obtained from which it was possible to draw filaments. Longer reaction times gave products which were more solid, similar to organic polyacrylates.

Copolymers of Al methacrylate and Zr methacrylate were also obtained by this process.

Example 5

3.53 ml of methacrylic acid were added to 10.25 g of Al(O-sec.-Bu)$_3$ in 50 ml of toluene/isopropanol (1:1), and the resultant mixture was then stirred at room temperature for 30 minutes. 9.94 ml of 3-(trismethoxysilyl)-propyl methacrylate (MEMO) and 50 mg of benzoyl peroxide were added, and the mixture was warmed to 80° C. After 30 minutes, a viscous sol was obtained; it was possible to increase its viscosity by concentration and to draw filaments by hand. Drying of these filaments or of the gel powder at 120° to 140° C. gave clear, hydrolysisresistant products.

This experiment was carried out using the following further aluminum:methacrylic acid:MEMO molar ratios: 1:1:1, 1:1:2 and 1:1:3. Essentially the same results were obtained for these ratios. Even the replacement of Al(O-sec.-Bu)$_3$ by Zr(O-i-Pr). in the above experiment did not give any significant changes in the result.

Example 6

Preparation of a coating solution 10 g of Zr(O-i-Pr). were dissolved in 50 ml of toluene/isopropanol (1:1), 2.6 ml of methacrylic acid were added, and the mixture was hydrolysed using 1.6 ml of H$_2$O in 5 ml of isopropanol. The clear solution obtained was stirred for 30 minutes, 5.4 ml of MEMO were subsequently added, and the mixture was stirred at room temperature for a further 60 minutes. After a UV initiator (50 mg of Irgacure 184) was added, specimen slides were coated and UV-cured. Transparent coatings having layer thicknesses >1 μm were obtained by this process. Cracking did not occur.

What we claim is:

1. A process for fixing an inorganic species in an organic matrix, said process comprising:

bringing at least one compound of the empirical formula (I)

$$MR_n \qquad (I)$$

wherein

M is selected from sub-group metals, lanthanides, actinides, Al, Sn, B and Si, at least some of the radicals R, which may be identical or different, can be replaced by a complexing agent, and n is the quotient of the valency of M and the mean valency of the radicals R, into contact with at least one organic compound A which contains at least one functional group X which is capable of complexing with M and is capable of replacing at least some of the radicals R, and, in addition, contains at least one functional group Y which is capable of participating in a polymerization or polycondensation reaction, in a molar ratio of the compounds of the formula (I) to the compounds A such that the number of radicals R which can be theoretically replaced is greater than the number of radicals which can theoretically be replaced by the groups X, at least some of the radicals R remaining on M when complexing is complete being radicals R* which can be replaced by OH radicals by reaction with water;

when complexing is complete, adding water in amounts such that and under conditions such that at least some of the radicals R* are replaced primarily by OH groups;

condensing said so-formed OH groups to form oxygen bridges linking atoms M; and subsequently, carrying out a polymerization or polycondensation in which the at least one functional group Y of compound A participates.

2. The process as claimed in claim 1, wherein said at least one compound of the empirical formula (I) is partially hydrolysed or pre-condensed prior to contact with said at least one organic compound A.

3. The process as claimed in claim 1, wherein, in order to form said organic matrix, a polymerization is carried out.

4. The process as claimed in claim 3, wherein said polymerization is a free-radical polymerization.

5. The process as claimed in claim 3, wherein at least one organic polymerizable compound which is different from the complexing agent is also employed in the polymerization.

6. The process as claimed in claim 5, wherein said at least one organic polymerizable compound is styrene or acrylonitrile.

7. The process as claimed in claim 1, wherein M is selected from one or more elements of the group consisting of Al, V, Ti, Zr, HF, Sn, U, B and Si.

8. The process as claimed in claim 7, wherein M is selected from one or more elements of the group consisting of Al, Ti and Zr.

9. The process as claimed in claim 7, wherein at least one compound of the formula (I) is a compound of the formula (II)

$$AlR'_3 \quad (II)$$

wherein the radicals R', which may be identical or different, denote halogen, alkoxy having 1 to 8 carbon atoms or alkyl having 1 to 8 carbon atoms.

10. The process as claimed in claim 9, wherein the radicals R', which may be identical or different, denote chlorine, bromine, alkoxy having 1 to 4 carbon atoms or alkyl having 1 to 4 carbon atoms.

11. The process as claimed in claim 7, wherein at least one compound of the formula (I) is a compound of the formula (III)

$$M'R''_4 \quad (III)$$

wherein M' represents Ti or Zr; and the radicals R'', which may be identical or different, denote halogen or alkoxy having 1 to 8 carbon atoms.

12. The process as claimed in claim 11, wherein the radicals R'', which may be identical or different, denote chlorine, bromine or alkoxy having 1 to 4 carbon atoms.

13. The process as claimed in claim 1, wherein compound A contains, as functional group X, a carboxyl group or the structural unit —CO—CH$_2$—CO—.

14. The process as claimed in claim 1, wherein compound A contains, as functional group Y, an ethylenically unsaturated group.

15. The process as claimed in claim 14, wherein said ethylenically unsaturated group is CH$_2$=CZ—, where Z represents H or CH$_3$.

16. The process as claimed in claim 1, wherein compound A is selected from the group consisting of acrylic acid, methacrylic acid, alkyl acetoacetate and vinyl acetoacetate.

17. The process as claimed in claim 1, wherein a polymerization catalyst is used in said polymerization, said polymerization catalyst being selected from the group consisting of benzoyl peroxide, azobisisobutyronitrile and a UV initiator.

18. The process as claimed in claim 1, wherein the ratio between the compounds of the formula (I) and the compounds A is selected so that, after complexing, two radicals R* remain on each atom M and are then removed by reaction with water.

19. An organic matrix with inorganic species fixed therein produced by the process as claimed in claim 1.

* * * * *